United States Patent [19]

Reinhold

[11] Patent Number: 4,646,405

[45] Date of Patent: Mar. 3, 1987

[54] HANDLE FOR TOOLS HAVING A CONVERGING TANG

[75] Inventor: Eberhard Reinhold, Esslingen, Fed. Rep. of Germany

[73] Assignee: Friedr. Dick GmbH, Esslingen, Fed. Rep. of Germany

[21] Appl. No.: 797,145

[22] Filed: Nov. 4, 1985

[30] Foreign Application Priority Data

Nov. 23, 1984 [DE] Fed. Rep. of Germany ... 8434255[U]

[51] Int. Cl.⁴ .......................... B23D 71/14; B25G 3/10

[52] U.S. Cl. .......................................... 29/80; 30/329

[58] Field of Search ................ 81/489; 29/80; 30/340, 30/329

[56] References Cited

U.S. PATENT DOCUMENTS

| | | | |
|---|---|---|---|
| 2,550,775 | 5/1951 | Clark | 30/329 X |
| 2,809,846 | 10/1957 | Whiteford | 29/80 |
| 2,977,668 | 4/1961 | Maness | 29/80 |
| 4,251,214 | 2/1981 | Schnall | 30/329 X |
| 4,327,465 | 5/1982 | Moritsch | 29/80 |

FOREIGN PATENT DOCUMENTS

| | | | |
|---|---|---|---|
| 210843 | 8/1960 | Austria | 29/80 |
| 1214587 | 11/1959 | France | 29/80 |
| 2274408 | 2/1976 | France | 29/80 |
| 790183 | 2/1958 | United Kingdom | 29/80 |

*Primary Examiner*—Jimmy C. Peters

*Attorney, Agent, or Firm*—Michael J. Striker

[57] ABSTRACT

A handle for use in connection with tool tangs of a wide variety of sizes and shapes includes a handle body molded of a plastic material and formed with a main blind bore whose end wall is formed with a centering bore of smaller diameter. The main blind bore serves for receiving tapering tangs of largest cross section, or a tubular insert. The insert has a first axial bore opening at one end of the insert and a second axial blind bore opening at the other end of the insert. The end walls of the first and second blind bores are interconnected by a passsage of reduced diameter. The jacket of the insert is split by an axially directed slot so as to facilitate plugging of the insert into the main blind bore in the handle body. The inner surface of the main blind bore and the outer surface of the insert are knurled to prevent rotation of the insert. The tapering tangs of the tool are held in position in the handle at two axially spaced areas.

11 Claims, 5 Drawing Figures

Fig. 4
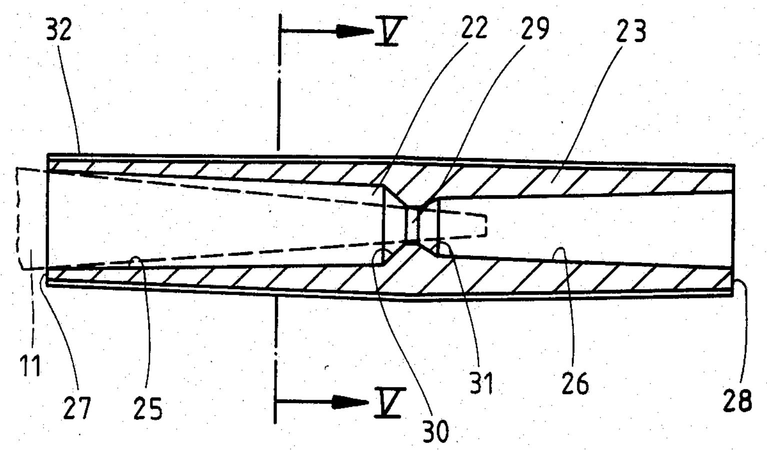
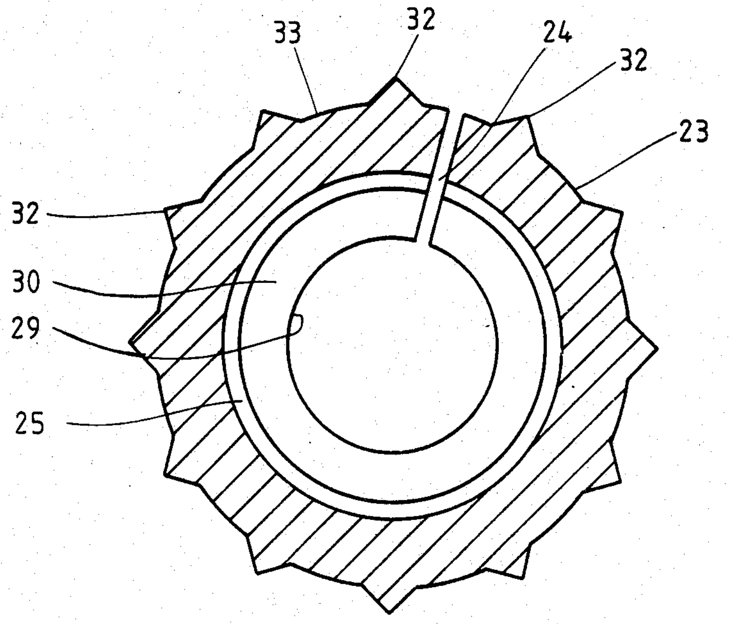
Fig. 5

HANDLE FOR TOOLS HAVING A CONVERGING TANG

BACKGROUND OF THE INVENTION

The present invention relates to a handle or grip for hand operated tools such as files or rasps and the like, provided at one end thereof with a converging tang insertable into a plug-in channel in the handle. This invention also relates to a modifications of the handle of this kind in which a tubular insert is removably introduced into a blind bore in the handle and the tang of the tool is introduced into a plug-in channel in the insert.

Handles of the above described kind are known, particularly in the form of a molded piece of plastic material which during its manufacture is provided with a hole which later on but before the mounting of the handle on the tool is drilled up to produce the plug-in channel matching the shape and size of the tang of a particular hand tool. Apart from the disadvantage that this additional drilling step complicates the manufacture and increases manufacturing costs, once the handle has been fitted by the manufacturer to a specific tool, it cannot be used for other tools having different configurations of their tangs. If a user of the handle needs a new handle the size and shape of the tang must be exactly specified and the handle finished by the manufacturer matches the corresponding tool only. If the specification of the tang dimensions is not available, the fit of the handle cannot be guaranteed. Another disadvantage of prior art handles is also the fact that once a fitting plug-in channel has been bored and the handle secured to the tool, it cannot be removed and attached to another tool having different size and shape of its tang. Moreover, in manufacturing preshaped handle pieces of plastic material there occur manufacturing problems inasmuch as in order to produce a hole of relatively small diameter, a correspondingly small core in the form is to be used which frequently has insufficient mass to permit the formation of cooling channels for the internal cooling. In the absence of cooling of the core there is always a risk during the shaping process that in the inner hollow spaces shrink holes or cavities and the like irregularities are created which later on may cause cracks or similar damages. It is also a disadvantage of prior art handles adjusted in advance to a particular tang of a tool, it cannot be guaranteed that after the insertion of the tang into the plug-in channel of the handle the tool is really permanently and ridgedly anchored in the handle.

In the prior art embodiment of a handle having a tubular insert in an axial blind bore, it is possible during the manufacture of preshaped handle pieces of plastic material to provide the cooling channels in the core for shaping the axial blind bore. However, even in this case the disadvantage remains that depending on the shape and size of respective two tangs a corresponding adjustment of the clearance of the axial bore on the handle piece is necessary so as to match the corresponding insert. It is true that the additional drilling step for the adjustment of the plug-in channel to the particular tang size is dispensed with, nevertheless the axial bore for receiving the insert must be designed such as to firmly hold inserts for different sizes of tangs. In practice, this requirement cannot be fulfilled for a broader range of tang sizes. Even if the inserts can be shaped to fit different sizes of the tangs, the spectrum of applicable tool shanks is limited and in addition the requisite firm seat of the insert in the receiving axial bore is questionable.

SUMMARY OF THE INVENTION

It is therefore a general object of the present invention to provide an improved handle of the above described kind which without the need of any additional adaptation on the part of the manufacturer, can be used practically for all conventional shapes and sizes of tangs of the tools.

Another object of this invention is to provide such an improved handle which is suitable not only for the first or initial fitting on a tool tang but also if desired can be repeated to another tool.

Still another object of this invention is to provide such an improved handle which can be effectively attached to a tool by nonskilled users in such a manner that a firm and reliable hold on the tool is always guaranteed.

In keeping with these objects and with others which will become apparent hereafter, one feature of this invention resides, in a combination which comprises the provision of a handle body formed with a blind bore for receiving and engaging a major part of the converging tang of the tool, and a centering bore of reduced diameter coaxially formed in the end wall of the blind bore to receive and engage the tip portion of the tang.

In a modified version of this invention the handle body is formed with a main blind bore for receiving a tubular insert, the tubular insert being formed at one end thereof with a first axial bore for receiving the tang of a tool, and at the opposite end with a second blind bore of a different diameter to receive a tang of another tool when the insert is plugged into the main bore in reversed position.

Hence, the axial plug-in bores in the handle of this invention are stepped down in diameter whereby the main axial bore in the handle has the largest diameter, the front of the first axial bore in the insert has a reduced diameter and the rear or the second axial bore in the insert has a still smaller diameter. The centering bores at the ends of a respective first and second axial bores have the least diameter. In this manner, different ranges of diameter are brought in an operational relationship. The axial bore in the handle body which has the maximum clearance does permit during the manufacture to use in the mold an inner core which has a sufficient cross section for being provided with cooling channels for the inner cooling. As a consequence, a high quality structure is obtained even at large cross sectional congestion whereby the risk of possible shank holes, cavities and the like is eliminated. The matching of the handle to a particular shape and size of a tool tang is effected either by using the main axial bore in the handle without the insert or by introducing the removable insert in the main blind bore from one or a reversed position so that the tool tang is plugged in the corresponding first or second axial bore in the insert. Due to the stepped arrangement of the axial bores, the fitting of the tang always takes place without the need of any readjustment on the part of the manufacturer. The mounting of the handle therefore can be readily made by unskilled workers and directly by users of the tool. In other words, the user can readily modify the handle in such a manner that it fits any tool irrespective of the size and shape of its tang. The handle of this invention is suitable not only for a one time mount on a tool but also it can be later on removed and replaced on another tool. The converging tang of each tool engages the handle at two points, namely the engagement of its tip portion with the centering bore and at an axially spaced point of engagement between the tang portion of larger cross section and the corresponding axial bore. Consequently a reliably rigid enclosure and hold of the handle on the tang will result. In the manufacture of the handle blank from plastic material it is possible to adjust the quality of the material at least at these contact points.

In the preferred embodiment of this invention, the first and second axial bores in the insert are interconnected by a centering passage. Accordingly, after the tang is inserted into an axial plug-in bore, the tip of the tang does not abut against an end surface which might interfere with a rigid seat but projects into the free space of the opposite axial bore.

In a further elaboration of this invention, the inner wall of the main axial blind bore in the handle is formed with axially directed ribs and grooves continuously transiting into each other whereas the outer surface of the tubular insert is formed with axially directed ribs distributed on the periphery of the insert at a distance one from the other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a sectional side view of a plug-in insert for use in the handle of FIG. 1, shown on an enlarged scale; and FIG. 5 is a sectional front view of the insert of FIG. 4 taken along the line V—V and shown on an enlarged scale.

DESCRIPTION OF THE PREFERRED EMBODIMENTS

Figure 1:
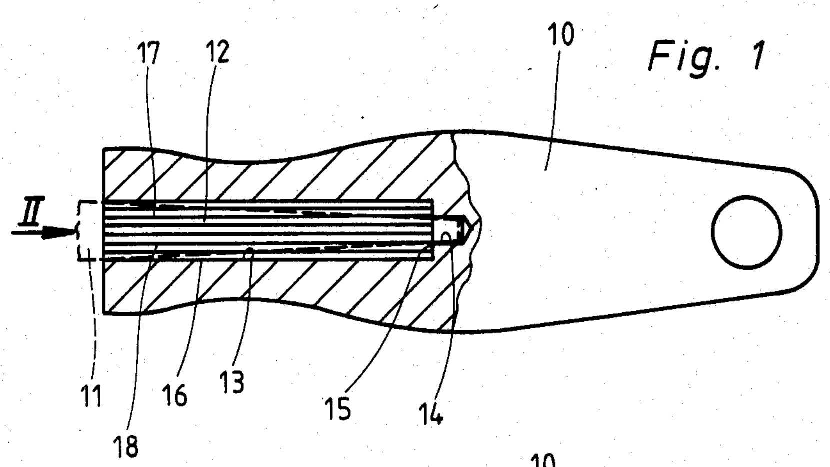
FIG. 1 is a side view, partly in section of a handle of this invention shown in connection with a converging tang of an nonillustrated hand tool.
Figure 2:
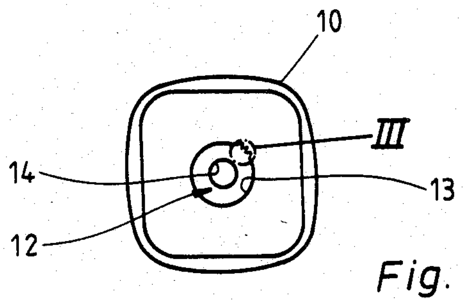
FIG. 2 is a front view of the handle of FIG. 1 taken in the direction of arrow II.
Figure 3:
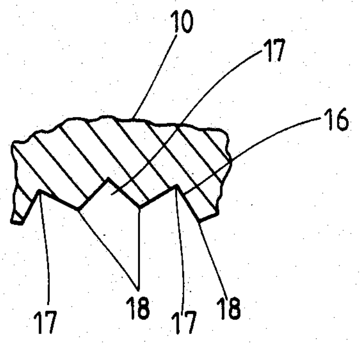
FIG. 3 is a sectional front view of a cutaway part III of the handle of FIG. 2, shown on an enlarged scale.

FIGS. 1 through 3 show a handle 10 for use in connection with a converging tang 11 of a nonillustrated hand tool, such as a file or a rasp and the like. The tang 11, depending on the size and type of the tool, may have different cross section and size. The example of FIG. 1 illustrates the fit of the handle of this invention with a converging tang of a maximum cross section at its base. The handle 10 is also applicable for a broad range of tangs of reduced cross sections when a detachable insert is used as it will be explained in detail below. In the example of FIG. 1, the handle 10 is a molded piece of plastic material preformed with the main plug-in channel 12 which consists of an axial main bore 13 and of a centering bore 14 of a substantially smaller diameter in the end 15 of the bore 13. For example, the diameter of the main axial bore 13 is ten millimeters and the diameter of the centering axial bore 14 is four millimeters. It will be seen from FIG. 1 that the tool tang 11 engages the inner wall of the main plug-in channel 12 at two axial spaced locations and in this manner it is firmly held in position in the handle. The tip portion of the tang, namely the right hand end in FIG. 1, and fits the centering bore 14. Depending on the steepness of the conical jacket of the tang and on the size of cross section at the base of the tang, a second area of contact 16 which is spaced apart from the first area of contact in the centering bore 14, is always established during the insertion of the tang in the channel 12. It is this two point engagement and the relatively large axial distance of the two engagement points which guarantee a reliable and permanent hold of the tang 11 in the handle 10 by utilizing the elasticity of the plastic material of the handle.

For work tools whose tang 11 has a smaller cross section than the clearance of the main plug-in channel 12, a tubular insert 23 is used. The tang 11 is plugged either into a front axial bore 22 or into a rear axial bore 26 depending from which direction the insert is plugged into the main axial bore 13 in the handle 10. In this manner, the handle of this invention can be used either with or without the insert to accommodate a very broad range of shapes and sizes of tangs 11. The mounting of the handle is very simple and can be made without the need of any skill on the part of the user. The plastic handle upon removal of one tool can be reused for a tang of a different size and diameter.

The tubular insert 23 which is also made of a plastic material forms a component part of the handle 10 and is delivered simultaneously with the latter. It will be seen from FIG. 5, the tubular insert 23 is interrupted by a slot 24 extending over the entire length of the insert. The clearance of the slot 24 is selected such as to enable within small limits the compression of the jacket of the insert in tangential direction during the plugging of the insert in the main axial channel 13 in the handle 10.

The insert 23 has a plug-in channel 22 consisting of a front axial bore 25 and of a coaxial rear bore 26. The diameter of the rear bore 26 differs from the diameter of the front bore to match the tangs of the least cross section at their base. For example, provided that the diameter of the main axial bore 13 in the handle 10 is ten millimeters, the front axial bore 25 in the insert has a diameter of about eight millimeters and the rear axial bore 26 has a diameter of about six millimeters.

The front axial bore 25 opens into the front end face 27 and the rear axial bore 26 opens into the rear end face 28 of the insert 23 when viewed in the direction of insertion into the main plug-in channel 12. As mentioned before, the insert 23 is insertable into the channel 12 either with leading rear end face 28. The trailing front end 27 is either flush with the flat end surface of the handle 10 or slightly overlaps the latter. Alternatively, the insert 23 is plugged into the main channel 12 in the handle from opposite ends namely with leading front end face 27 if a tool tang 11 of smallest diameter is to be attached. Preferably, the length of the insert 23 slightly exceeds the length of the axial main bore 13 in the handle 10 so that the projecting portion of the insert at the left hand end of the handle can be reached and the entire insert withdrawn from the main channel 12 if desired.

The two axial bores 25 and 26 in the insert 23 transit in an intermediate part of the insert into a coaxial centering passage 29 of smaller diameter. Accordingly, the bores 25 and 26 communicate with one another through the centering passage. Each axial bore 25 and 26 has a conical shape converging toward the centering passage. The inner end of each axially bore 25 and 26 transits into a first conical section 30 or 31 which in turn opens into the centering passage 29. The centering passage 29 in this example is located approximately halfway between the ends of the insert 23.

In the example of FIG. 5, the insert 23 has a substantially circular cross section. Each half of the jacket of the insert 23 is in the form of a truncated cone. The cones converge to respective end faces 27 and 28 and adjoin each other approximately at the center of the length of the insert. It will be noted however that the illustrated conical or converging configuration of the axial bores 25 and 26 as well as of the jacket of the insert is not necessary for proper operation of this invention but facilitates the manufacture for example during removal of the plastic molded blanks from the form.

The outer surface of jacket 23 is provided with alternating elevations 32 and recesses 33, preferably in the form of axially directed ribs and valleys. The ribs in this example have triangular cross section and the valleys 33 are the corresponding interspaces between the ribs. The sides of the elevations or ribs 32 form an angle of about 30° with the upper surface of the insert. The width of the valleys or grooves 33 is larger than the base side of the ribs.

The inner wall of the blind bore 12 in the handle 10 (FIGS. 1 through 3) is also provided with alternating grooves 17 and elevations 18 extending in axial direction. These recesses 17 and elevations 18 can be of a corresponding shape as those on the insert 23 or as shown in FIG. 3, both the grooves 17 and the elevations 18 may have a similar triangular cross section so that the ribs and grooves in the inner wall 16 regularly alternate with each other without any interspaces.

When the insert 23 is plugged into the main axial bore 13 of the handle, the elevations 32 and the grooves 33 of the insert positively engage the corresponding recesses 17 and grooves 18 in the main plug-in channel 12 and consequently the insert 23 is secured against unintentional axial rotation. As soon as the insert 23 is fully inserted in the axial bore 13 and its rear ends 28 abuts against the end wall 15 in the handle, then the tool tang 11 is plugged into the front axial bore 25 and passed in axial direction until its tip engages firmly the centering bore 29 in the insert and its base portion snugly engages a part of the inner wall of the main axial bore 13. As indicated by dashed lines in FIG. 4, the tip part of the tang 11 is allowed to pass entirely through the centering passage 29 and to project into the free space of the rear axial passage 26. In this manner, the fit of the tang 11 in the insert is achieved automatically during its axial movement. The fixing points of the tang are always in the region of the constricted central passage 29 and at the inlet openings 27 or 28 which are spaced apart from the centering passage a relatively long distance. Consequently, by virtue of the elasticity of the plastic material the tang 11 is always firmly held in position.

In the event that the base cross section of the tang does not match the clearance of the front opening of the passage 25, then the position of the insert 23 in the channel 12 is reversed and the tang is inserted into the axial passage 26 of smaller diameter.

If the user decides to replace the handle on the tool, the used handle can still be mounted in the same fashion on another tang, preferably of a different size or shape. Even in this case, the handle of this invention does not need any adjustment work and the user attaches the handle in the same manner as described above. Since the handle 10 with the insert 23 according to this invention can be used in connection with an extremely large spectrum of different cross sections of the tangs, it suffices to manufacture a single type of the handle 10 and of the insert 23 to cover all conventional sizes of the tools. As a consequence, most manufacturing costs and storing expenditures are substantially reduced. The handle of this invention from the point of view of the user has the advantage that it is insured both against loosening in axial direction and against rotational movement relative to the tang.

While the invention has been illustrated and described as embodied in a specific example of a handle of plastic material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letter Patent is set forth in the appended claims.

1. A handle for tools having a converging tang, such as files or rasps, comprising a handle body formed with a main blind bore for accommodating a major part of said tang, a centering bore of reduced diameter formed in the end wall of the blind bore to engage the tip portion of said tang, a separate tubular insert fitting said blind bore in the handle body, said tubular insert being formed at one end thereof with a first axial bore to receive the tang of a tool, and at opposite end thereof, with a second blind bore of a different diameter to receive a tang of a different size of shape when said insert is introduced into said blind bore of the handle in the reversed position, the inner wall of the main blind bore in said handle body and the outer surface of said insert being provided with axially directed alternative ribs and grooves to prevent rotation of the plugged-in insert, said ribs and grooves in the inner wall of said main blind bore being of a triangular cross section and continuously alternate one with the other, and the ribs on said insert being triangular in cross section and being separated one from the other by a distance exceeding the base side of said ribs.

2. A handle as defined in claim 1, wherein the end walls of said first and second axial passages in said insert are provided respectively with an axial centering bore of reduced diameter.

3. A handle as defined in claim 2, wherein said centering bores of reduced diameter are interconnected to form a common centering passage communicating with both first and second axial passage in said insert.

4. A handle as defined in claim 3, wherein the ends of said first and second axial bores in said insert transit into frusto-conical passages communicating with corresponding openings of said centering passage.

5. A handle as defined in claim 4, wherein said centering passage is located approximately at a center region of a center axis of said insert.

6. A handle as defined in claim 5, wherein said first and second axial bores in said insert taper respectively toward said centering passage.

7. A handle as defined in claim 1, wherein said insert has a substantially circular cross section, the jacket of said insert slightly tapering from a center region toward respective ends of the insert.

8. A handle as defined in claim 1, wherein said ribs and grooves both on said insert and in said main blind bore are of a triangular cross section.

9. A handle as defined in claim 1, wherein said insert is formed with an axially directed slot separating the tubular jacket of the insert so as to facilitate plugging of the insert into said main blind bore in the handle.

10. A handle as defined in claim 1, wherein said handle body is a molded piece of a plastic material.

11. A handle as defined in claim 1, wherein said insert is molded of a plastic material.

* * * * *